March 26, 1946.    E. F. GINGRAS    2,397,313
DRIVING BELT
Filed March 5, 1943
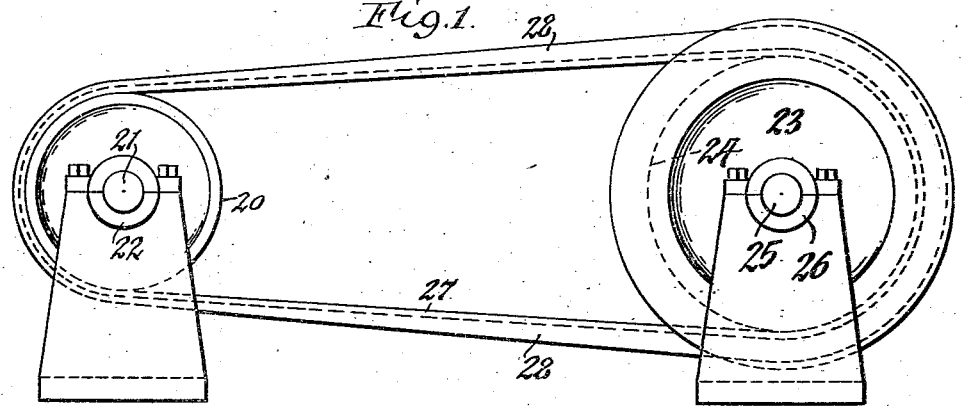
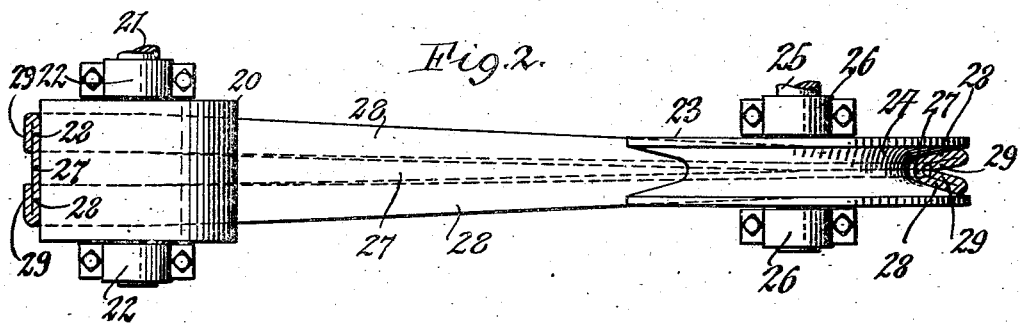
Edward F. Gingras
INVENTOR.
BY Popp & Popp
ATTORNEYS Patented Mar. 26, 1946

2,397,313

UNITED STATES PATENT OFFICE 2,397,313

DRIVING BELT

Edward F. Gingras, Buffalo, N. Y.

Application March 5, 1943, Serial No. 478,100

1 Claim. (Cl. 74—231)

This invention relates to a driving belt for transmitting power from one pulley to another, and more particularly to a driving belt which is adapted to engage V-shaped grooves on the peripheries of a pair of pulleys but may also be engaged with a pair of pulleys one of which has a V-shaped peripheral groove for receiving the belt and the other a straight or substantially cylindrical periphery for engagement with another part of the belt.

It is the object of this invention to provide a belt of this character made of leather, rubber or similar pliable material which will run on V-grooved pulleys and also straight faced pulleys and which is of such construction that the same will obtain a much firmer grip on the sides of a V-groove on the periphery of a pulley and thereby avoid slippage and cause a greater amount of power to be transmitted.

In the accompanying drawing:

Fig. 1 is a side elevation showing one form of my improved driving belt applied to a pair of pulleys one of which has a V-grooved periphery and the other a cylindrical periphery for engagement with the driving belt.

Fig. 2 is a top view corresponding to Fig. 1, but showing the pulleys in plan and the belt in section.

In the following description similar reference characters indicate like parts in the several figures of the drawing.

Although this improved driving belt may be applied to the members of a pair of grooved pulleys for transmitting motion and power from one to the other, this belt is shown in Figs. 1 and 2 applied to a pair of pulleys one of which, 20, has a cylindrical periphery and is mounted on a shaft 21 which is journaled in bearings 22 and the other, 23, of which is provided on its periphery with a circumferential groove 24 which is V-shaped in cross section and is mounted on a shaft 25 which is journaled in bearings 26.

Referring to the construction of the belt shown in Figs. 1 and 2, the numeral 27 represents a longitudinal body band or strip of leather, rubber or the like which may be made continuous or endless in any suitable manner and form two curved turns which pass around the pulleys and two straight stretches connecting the corresponding ends of the turns. This band forms two parallel longitudinal flanges 28, 28, the inner edges of which are connected along the longitudinal centerline of the band and these flanges are folded toward each other to form a V in cross section which fits the correspondingly shaped groove of a pulley when passing around a pulley of this character, as shown at the right of Figs. 1 and 2. The flanges also unfold so as to be even with one another when passing around the cylindrical surface of a pulley, as shown at the left of Figs. 1 and 2.

For the purpose of increasing the tractive effect of the belt while passing around the grooved pulley, stop means are provided which limit or restrain the movement of the flanges toward each other while passing around the grooved pulley. In the construction shown in Figs. 1 and 2 this is accomplished by two longitudinal flaps 29 which are arranged parallel with each other on the outer side of the band on transversely opposite sides of its longitudinal center, and each of these flanges being connected with the corresponding outer edge of the respective flange but all parts of this flap, arranged inwardly from its outer edge, being detached from the companion flange and free to slide relatively thereto. As the belt passes around the cylindrical pulley the stop flaps are out of engagement from each other, as shown at the left of Fig. 2, thereby permitting the flanges to bear with their maximum area against the periphery of this pulley, but when this belt passes around the grooved pulley the flaps engage with each other and limit the folding action of the flanges so that the latter are held firmly against the outwardly diverging surfaces of the V-shaped groove, whereby the maximum tractive effect of the belt is obtained when passing around a cylindrical pulley and a V-grooved pulley.

As the belt passes on and off of a V-grooved pulley the flaps slide freely on the flanges and thus enable the belt to readily adjust itself to the varying positions which it assumes during this operation and avoids any undue strain or wear on the same.

For the purpose of further aiding the belt to freely fold and unfold as it passes around the groove in the pulley the outer edge portions of the flanges and beads are stretched or worked so as to render them more pliable than the inner parts of the belt nearer the longitudinal centers of the same, thereby retaining the length of the belt at the center and the maximum tractive effect of this part of the belt, but permitting the opposite longitudinal edge portions of the belt to expand and contract the requisite extent to suit the greater diameter of these parts of the belt when passing around the grooved pulley.

I claim as my invention:

A driving belt comprising a band of flexible material consisting of two wide longitudinal flanges arranged parallel and having their inner edges integrally connected and two narrow longitudinal flaps arranged on the outer side of said flanges and having their outer edges integrally connected respectively with the corresponding edges of said flanges, and said band upon being fully unfolded transversely having its flanges arranged in the same plane and the inner edges of said flaps spaced from each other, and said band upon being folded along its longitudinal center so that its flanges and flaps diverge outwardly into substantially V-form in cross section will cause the inner edges of said flaps to engage with each other and increase the transverse rigidity of the belt in this position.

EDWARD F. GINGRAS.